United States Patent [19]

Rangappan

[11] Patent Number: 5,218,754

[45] Date of Patent: Jun. 15, 1993

[54] METHOD OF MANUFACTURING PAGE WIDE THERMAL INK-JET HEADS

[75] Inventor: Anikara Rangappan, Torrance, Calif.

[73] Assignee: Xerox Corporation, Stamford, Conn.

[21] Appl. No.: 989,261

[22] Filed: Dec. 11, 1992

Related U.S. Application Data

[63] Continuation-in-part of Ser. No. 789,490, Nov. 8, 1991, abandoned.

[51] Int. Cl.$^5$ .................. H05B 3/00; G01D 15/16
[52] U.S. Cl. .................. 29/611; 29/890.1; 346/140 R
[58] Field of Search ........... 29/611, 890.1; 346/1.1, 346/140 PD

[56] References Cited

U.S. PATENT DOCUMENTS

| | | | |
|---|---|---|---|
| 4,032,929 | 6/1977 | Fishbeck et al. | 346/140 |
| 4,115,789 | 9/1978 | Fishbeck et al. | 346/140 |
| 4,774,530 | 9/1988 | Hawkins | 346/140 PD |
| 4,803,499 | 2/1989 | Hayamizu | 346/140 PD |
| 4,829,324 | 5/1989 | Drake et al. | 346/140 |
| 4,851,371 | 7/1989 | Fisher et al. | 437/226 |
| 4,899,181 | 2/1990 | Hawkins et al. | 346/140 PD |

Primary Examiner—P. W. Echols
Attorney, Agent, or Firm—Fariba Rad

[57] ABSTRACT

A new thermal ink jet print head designed to have a page wide length. A channel plate is made on a single piece of desired length, preferably the width of the paper being printed, by molding any material that can be molded. Subsequently, the channel plate is hardened to form a rigid structure. Due to the limitations of the silicon chip lengths, as a result of process yield, the heaters are made in plurality of chips and then the heater chips are precisely diced and bonded to the channel plate.

2 Claims, 8 Drawing Sheets

METHOD OF MANUFACTURING PAGE WIDE THERMAL INK-JET HEADS

This application is a continuation-in-part of application Ser. No. 07/789,490, filed Nov. 8, 1991, now abandoned.

BACKGROUND OF INVENTION

This invention relates generally to a design of a page wide thermal ink jet print head and more particularly concerns a thermal ink jet print head which has a page wide monolithic channel plate with a plurality of heater chips bonded thereto. It is possible to make the long heater chips. However, usually the yield is much less than for smaller chips. Therefore, it is desirable to make a plurality of small heater chips, which have less chance of containing defective heating elements, and abut them together.

Traditionally channels are made on one chip and heating elements are made on a different chip and the two chips are bonded together to form a thermal ink jet module. Presently, an approach is used to abut several co-linear thermal ink jet modules to form a long print head. In this technology, it is extremely difficult to make a long array of modules.

The difficulty arises from bonding two wafers together. To avoid the alignment of each individual heater chip to each individual channel chip (if the heater chips and channel chip were diced from the wafers prior to assembly), the heater wafer is bonded to the channel wafer which requires only one alignment. Once the wafers are bonded together one can not tell where the space between the modules are and therefore, accurate cutting between the modules becomes extremely difficult. As a result, a four step cut is required to dice the modules. Two precise and shallow cuts, one along the edge of a channel chip and another along the edge of a heater chip, are made before bonding the two wafers together. The next two cuts are made after the two wafers are bonded together; one groove shaped cut from the top and another groove shaped cut from the bottom to get to the shallow cut. An imprecise cut causes the edges of the modules crack and the polyimide layers adjacent to the edges of the modules flake and as a result, the edges of the print head modules become jagged. Therefore, abutting the print head modules becomes difficult.

The next problem is aligning the modules before abutting them. The channels and nozzles of the abutted modules have to be on one plane while the pitch between the channels on the different modules where they are abutted must be the same as the pitch between the rest of the channels on the same module. Due to the imprecise cuts to dice the modules, large tolerances are introduced.

One approach to avoid the tolerance problems caused by imprecise cuts is to arrange the modules on two print head bars with staggered modules precisely placed. The two print head bars are placed in a machine in a precise distance apart. In this method, the modules are staggered on two bars in an alternate relationship. This technique requires a lot of mechanical precision and adds additional electronics to compensate for this construction.

Another approach as disclosed in U.S. Pat. No. 4,829,324, titled "Large array Thermal Ink Jet Print Head" is to have a page wide monolithic heater plate with abutted channel chips bonded to the heater plate. This technique, just like the aforementioned techniques, has the problem of aligning the channels and nozzles and keeping the pitch between the channels and nozzles on the different modules where they abut the same as the pitch between the rest of the channels and nozzles on the same module.

SUMMARY OF THE INVENTION

It is an object of this invention to reduce the aforementioned problems of prior art by making a monolithic page wide channel plate and bonding the channel plate to a series of abutted heater chips, thereby substantially eliminating the tolerance problems incurred by the prior art.

It is another object of this invention to dice the heater chips by one precise cut, thereby substantially eliminating the tolerance problems incurred by the prior art.

DESCRIPTION OF THE PREFERRED EMBODIMENT

Figure 1:
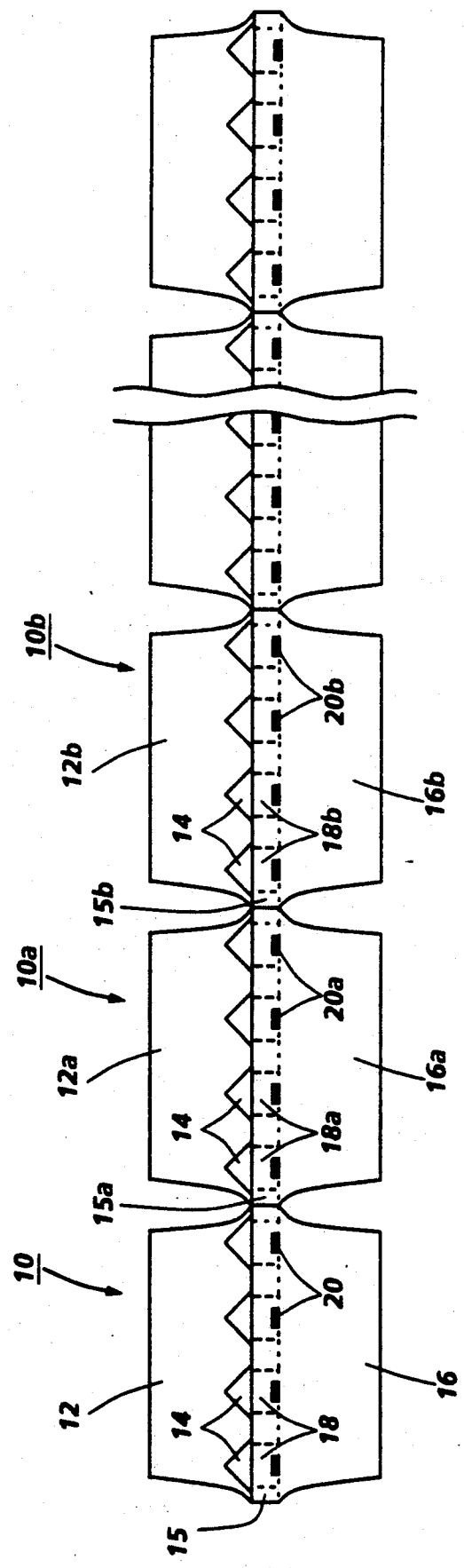
FIG. 1 is a side view of a prior art thermal ink jet print head bar.

FIG. 1 shows a prior art print head bar assembly which comprises ink jet modules 10, $10_a$ and $10_b$. Each module is made of a channel chip 12, $12_a$ and $12_b$ bonded to a heater chip 16, $16_a$, and $16_b$. Each heater chip 16, $16_a$, and $16_b$ includes a layer of polyimide 15, $15_a$ and $15_b$ in which containment chambers 18, $18_a$ and $18_b$, respectively, reside. Each chamber is laterally located at a predetermined distance from a respective nozzle 14, $14_a$ and $14_b$ and has a respective heating element 20, $20_a$ and $20_b$ located therein.

Figure 2:
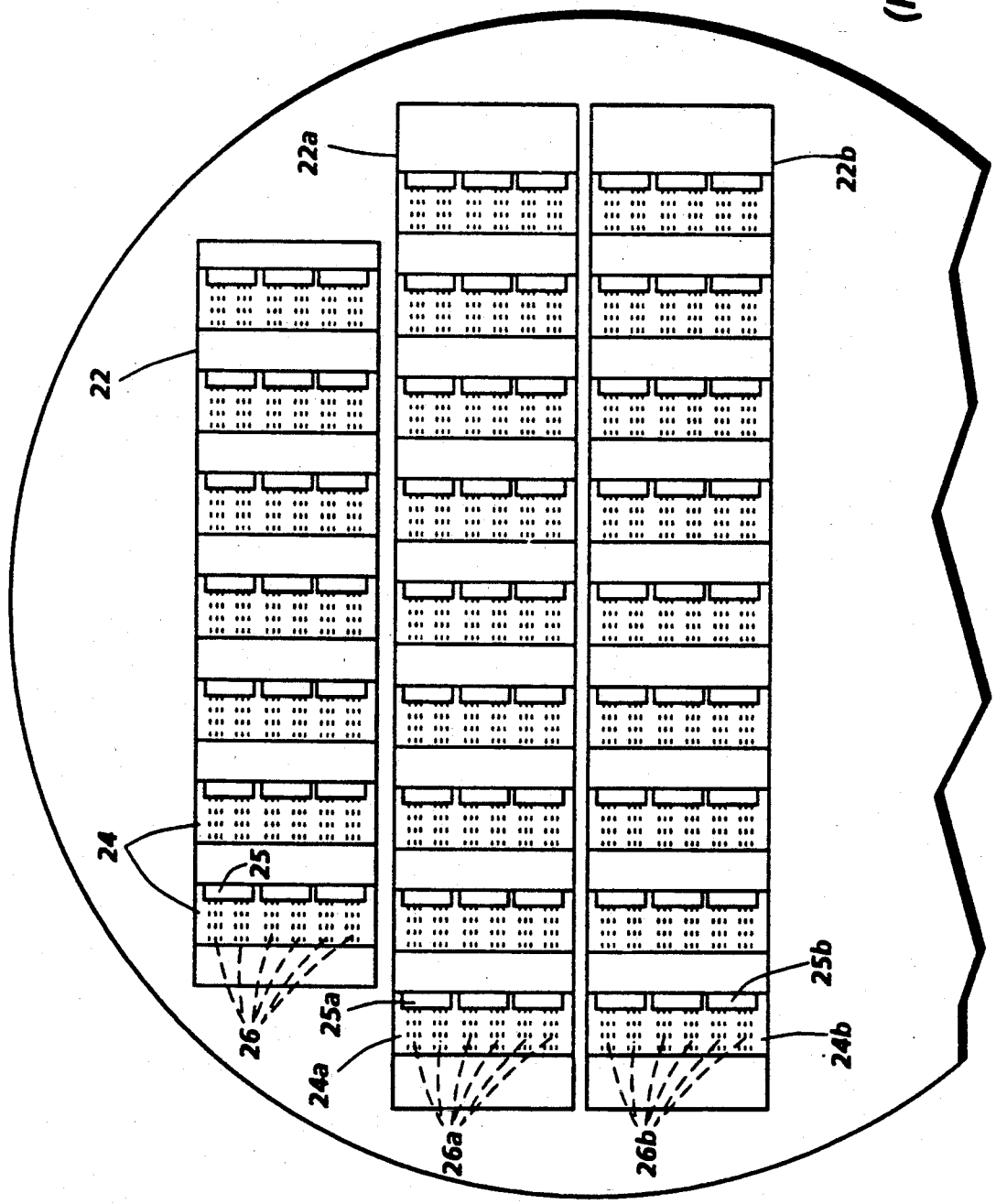
FIG. 2 is a top view of a prior art channel wafer.
Figure 3:
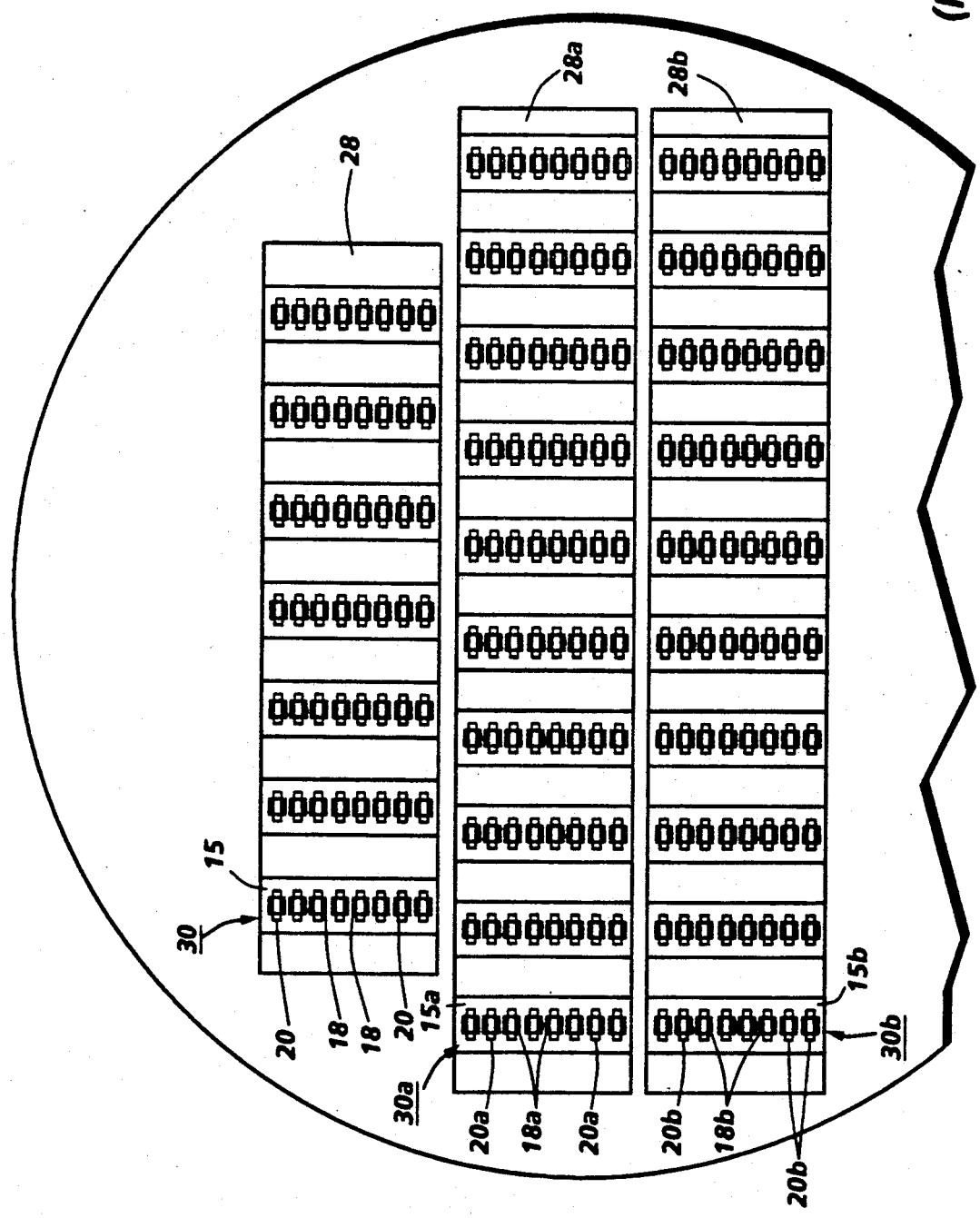
FIG. 3 is a top view of a prior art heater wafer.

Referring to FIG. 2 each row 22, $22_a$ and $22_b$ of a channel wafer contains a plurality of channel chips 24, $24_a$ and $24_b$ and each channel chip 24, $24_a$ and $24_b$ contains a plurality of channels 26, $26_a$ and $26_b$ and a plurality of ink reservoirs 25, $25_a$ and $25_b$. Referring to FIG. 3, each row 28, $28_a$ and $28_b$ of a heater wafer contains a plurality of heater chips 30, $30_a$ and $30_b$ and each heater chip 30, $30_a$ and $30_b$ contains a plurality of containment chamber 18, $18_a$ and $18_b$ in a layer of polyimide 15, $15_a$ and $15_b$ and a plurality of heating elements 20, $20_a$ and $20_b$. The layer of polyimide is deposited on the heater wafer over the heating elements and respective electronics (not shown). Then the polyimide layer 15, $15_a$ and $15_b$ is etched to form the chambers 18, $18_a$ and $18_b$ and expose the heating elements 20, $20_a$ and $20_b$ and subsequently the polyimide layer 15, $15_a$ and $15_b$ is cured.

Figure 4:
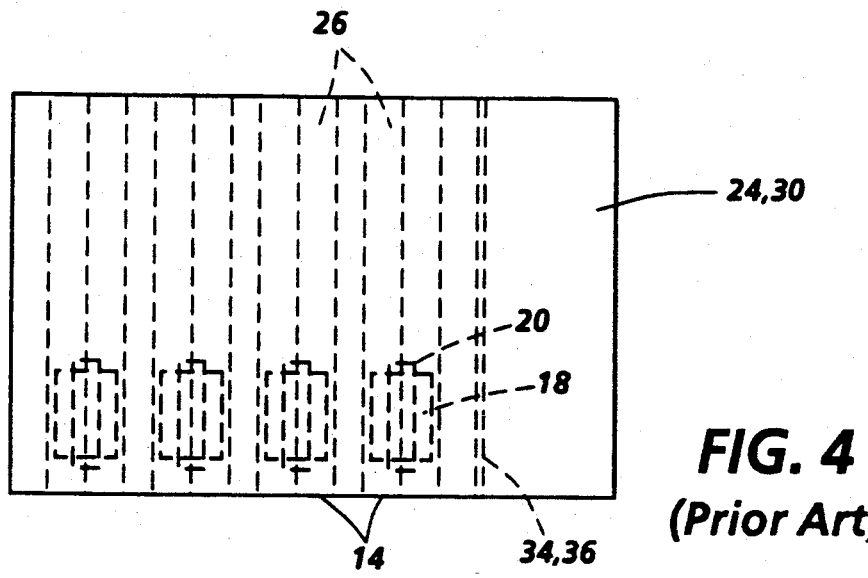
FIG. 4 is a top view of the prior art showing an channel chip bonded to a heater chip.

To avoid the alignment of each individual heater chip to each individual channel chip (if the heater chips and channel chip were separated from the wafers prior to assembly), the heater wafer is bonded to the channel wafer which requires only one alignment. FIG. 4 shows a top view of a channel chip bonded to a heater chip with any type of epoxy glue such as epoxy resin. Since the channel wafer and heater wafer are bonded together, the channels and the containment chambers are buried between the two wafers and therefore are not visible from either side of the bonded wafers. For simplicity, the reservoirs shown in FIG. 2 are not shown in FIGS. 4, 5, 5A, 6 and 7.

Figure 5:
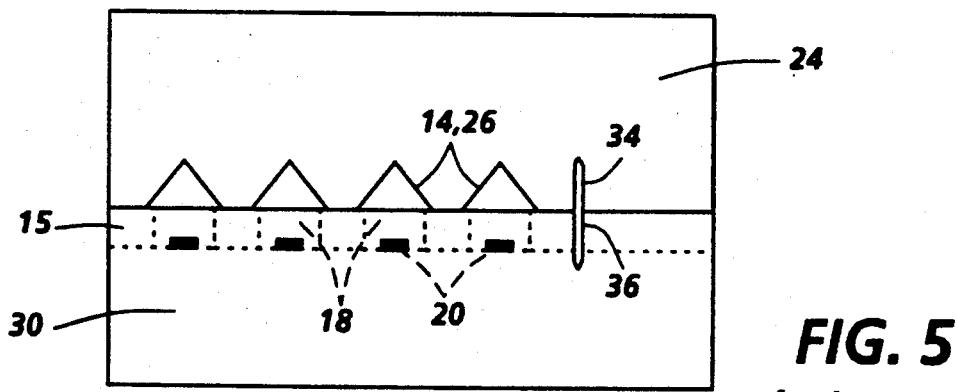
FIG. 5 shows a side view of a prior art channel wafer having a shallow cut bonded to a heater wafer having a shallow cut.
Figure 5A:
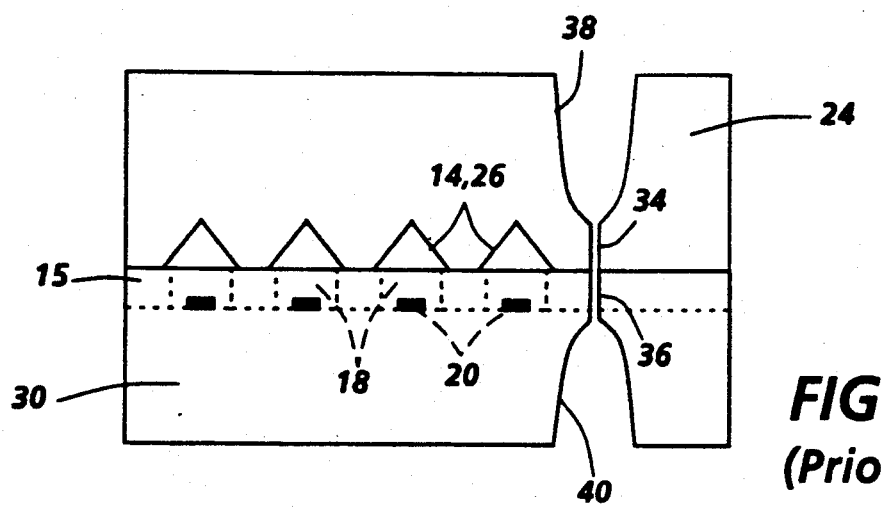
FIG. 5A shows a side view of a prior art two step grove shaped cutting process of a thermal ink jet print head module from a channel wafer bonded to a heater wafer.

To make as precise a cut as possible between two adjacent channel/heater modules a four step cut is used. Referring to FIG. 5, two precise and shallow cuts (50-60 microns in a 500 microns thick wafer), one cut 34 along the edge of a channel chip and another cut 36 along the edge of a heater chip, are made before bonding the two wafers together. Referring to FIG. 5A, the next two cuts are made after the two wafers are bonded together; one groove shaped cut 38 from the top and another groove shaped cut 40 from the bottom to reach the shallow cuts. Due to the groove shaped cuts the edges of the modules crack and the polyimide layer 15 adjacent to the edges of the modules flakes. The cracking and flaking create jagged edges at the edges of the modules which in turn cause a problem while abutting the modules.

Figure 6:
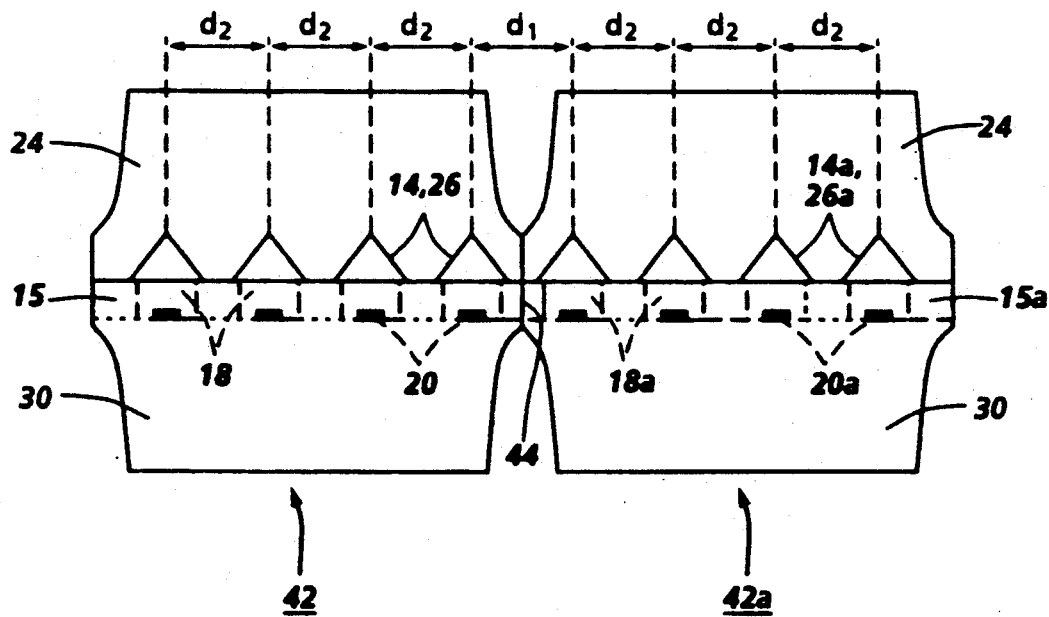
FIG. 6 is a side view of a prior art abutted assembly of two thermal ink jet print head modules.

FIG. 6 shows two modules 42 and $42_a$ of a print head being abutted together. The two edges created by the shallow cuts are abutted together along junction line 44. When abutting two modules extreme caution must be taken. Not only the interfaces, the surface between the channel chip and the heater chip, of the modules have to be aligned but also the nozzles of each module adjacent to junction line 44 must have the same pitch (the distance between the centers of each two adjacent nozzles) $d_1$ as the pitch $d_2$ between adjacent nozzles on the same chip. Due to the fact that a precise cut is not achieved for a high percentage of cuts, unsatisfactory tolerances are introduced with this type of an array.

Figure 7:
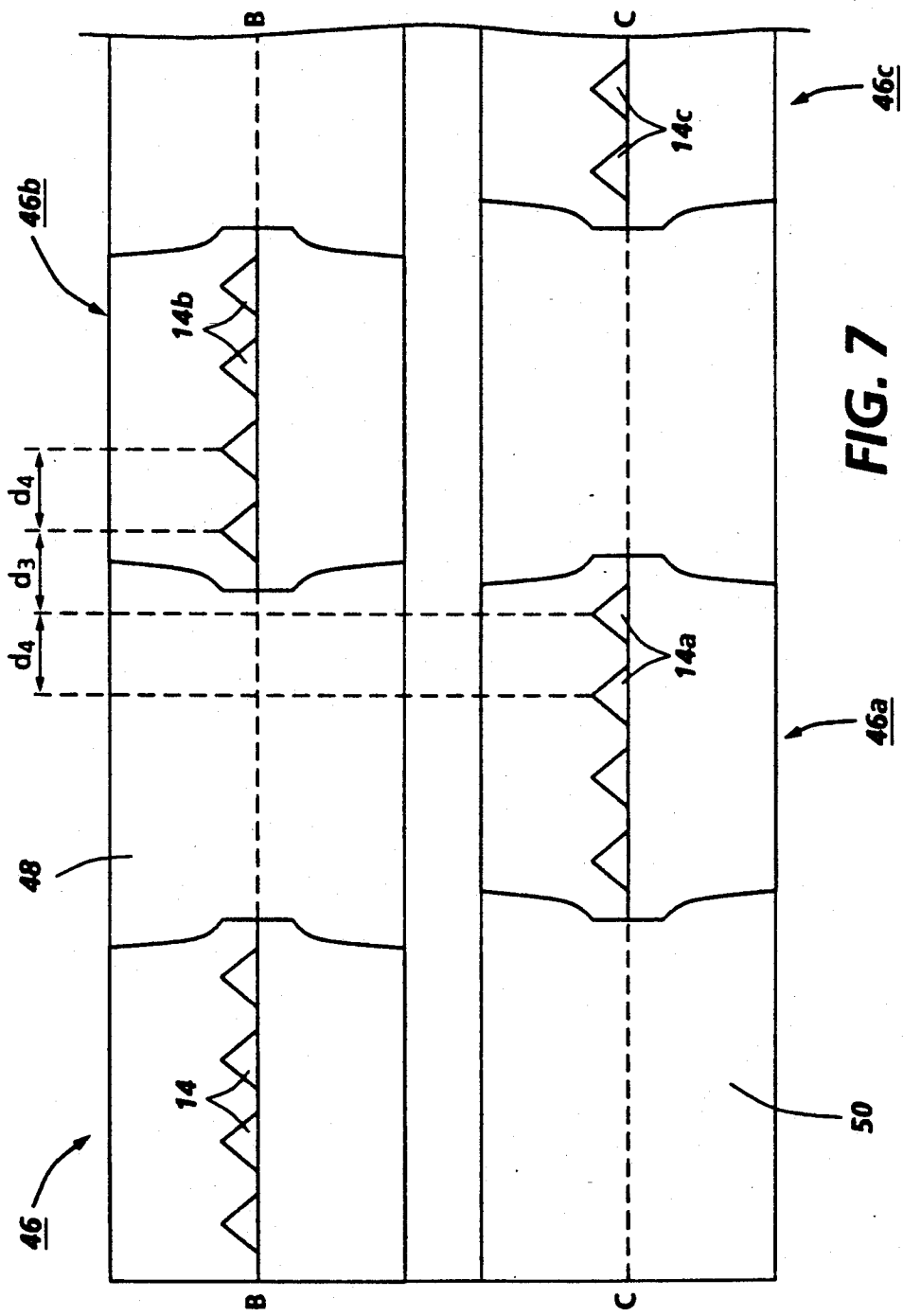
FIG. 7 is a side view of a prior art staggered thermal ink jet print head bar.

FIG. 7 shows a staggered print head which is an alternative assembly of the modules to avoid the tolerance problems discussed above. For simplicity, the containment chambers, the heating elements and the polyimide layers of the modules are not shown, but the modules are the same as previously described modules. In this method, the modules 46, $46_a$, $46_b$ and $46_c$ are placed on two parallel print head bars 48 and 50, alternate modules 46 and $46_b$ are placed on the first print head bar 48 and the remaining modules $46_a$ and $46_c$ are placed on the second print head bar 50 leaving an empty space for each removed module. The alignment of this method is even more complicated. All the nozzles 14 and $14_b$ of the modules 46 and $46_b$ on print head bar 48 must be aligned to be on line BB and all the nozzles $14_a$ and $14_c$ of the modules $46_a$ and $46_c$ on print head bar 50 must be aligned to be on line CC. Also the pitch (the distance between the centers of each two adjacent nozzles) $d_3$ between the end nozzle of each module on print head bar 48 and the following end nozzle of the following module on print head bar 50 must be the same as the pitch $d_4$ between adjacent nozzles on each module. The advantage of this method over the serially abutting method is that a precise cut at the edge of the modules is not needed. Since the modules are not abutted and each module has open space next to it, the module can be moved around for precise alignment with an adjacent preceding module from the other print head bar.

With this kind of print head each line of information must be electronically separated into two sets of data and stored. While the first set of nozzles 14 and $14_b$ are printing the first set of data, the second set of data is delayed till the paper reaches the position of nozzles $14_a$ and $14_c$. Consequently, the electronics for this kind of print head is more complex since the information for alternate modules has to be separated and sent to the print head bars separately. Furthermore, due to the number of steps involved in assembling this array, many tolerances are introduced.

Figure 8:
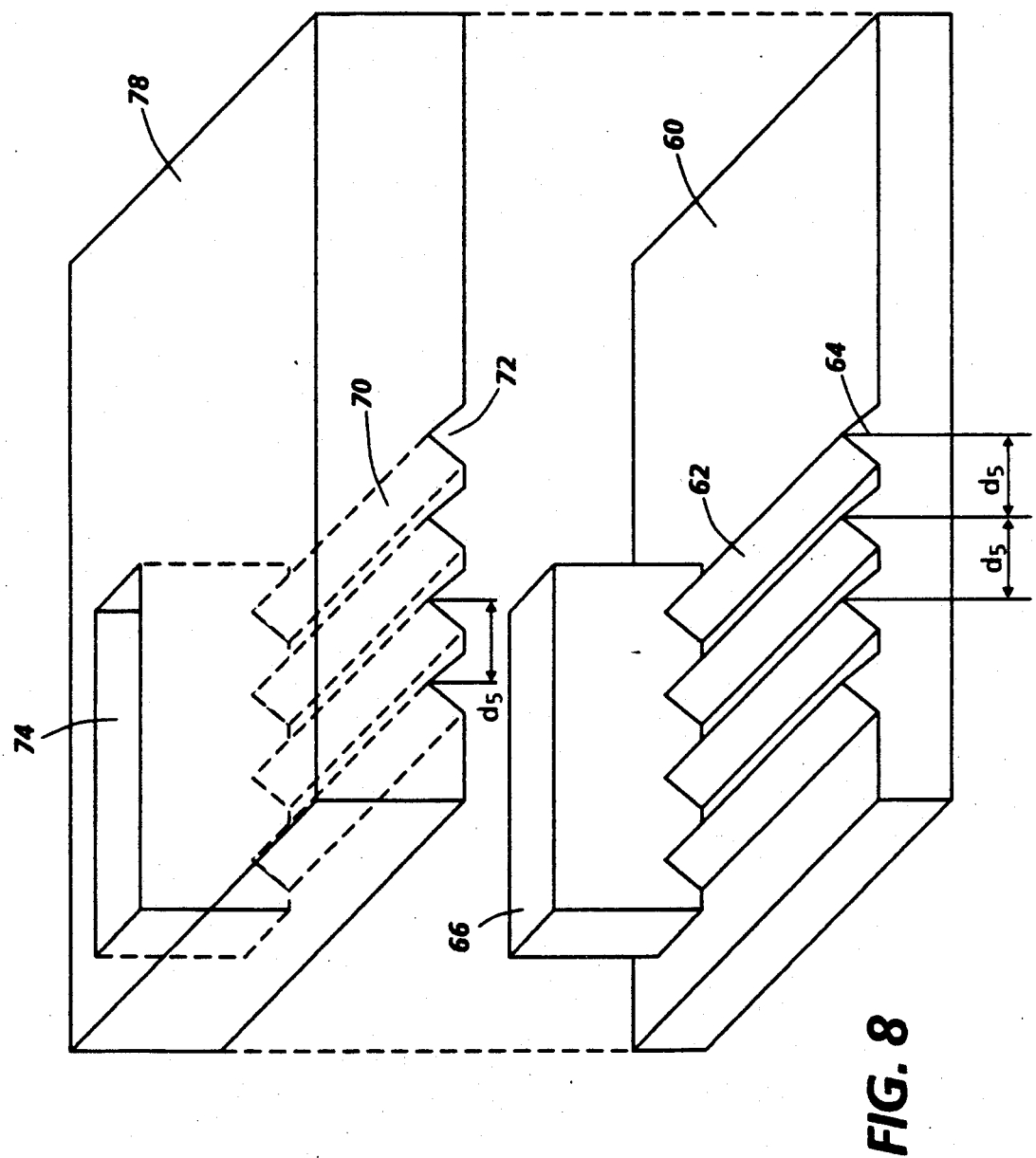
FIG. 8 is an isometric view of the present invention showing a channel plate molded over a mandrel.

Referring to the instant invention, FIG. 8 shows how a monolithic page wide channel plate is made. A mandrel 60 containing the shapes of channels 62, nozzles 64 with a same pitch $d_5$ between every two adjacent channels 62 or nozzles 64 and an ink reservoir 66 is made by any known technology. The mandrel substrate can be copper, aluminum, steel, nickel or any material that is hard and on which a desired shape can be made. Then any material such as ceramic "Green Tape", or polysulphnate (a plastic molding material) which can be molded and then cured can be used to be pressed or stamped on the mandrel by any well known process. The molded channel plate 78 which has channels 70, nozzles 72 and an ink reservoir 74 is cured between 850 degree Celsius to 920 degree Celsius depending on the material composition.

A channel plate of this invention can be made to be 6 to 36 inches long. Furthermore, the channel plate can be made to produce a given resolution. For instance, the pitch of the nozzles can be spaced to be 84.5 microns for 300 d/in or can be spaced to be 42.5 microns for 600 d/in.

Figure 9:
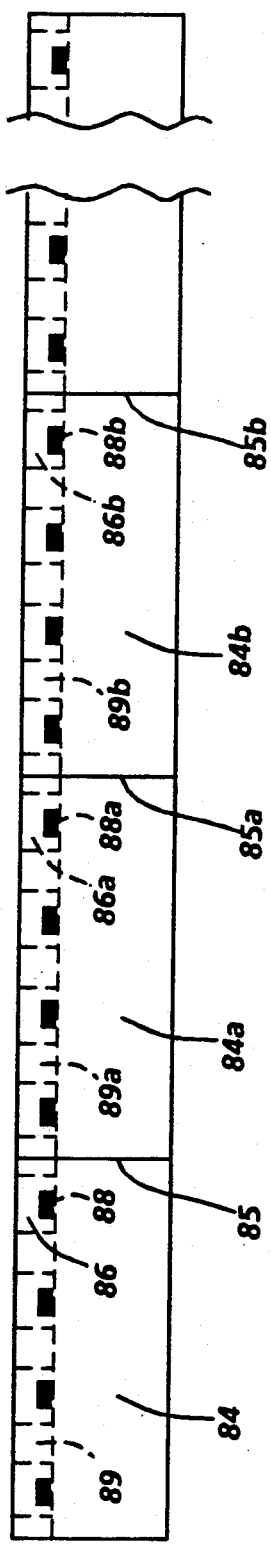
FIG. 9 is a side view of an end structure of an abutted assembly of heater chips of the present invention.

Referring to FIG. 9, the heater chips 84, $84_a$ and $84_b$ of this invention are the same as the heater chips in prior art. The heater chips 84, $84_a$, and $84_b$ are made on a polysilicon wafer and include a layer of polyimide 89, $89_a$ and $89_b$ in which containment chambers 86, $86_a$ and $86_b$ reside. Each chamber has a respective heating element 88, $88_a$ and $88_b$ located therein.

This invention eliminates the aforementioned problems of the prior art of FIGS. 1-7. The first advantage is to reduce the four step cut to one cut. In this invention, there is no need to glue the channel wafer to the heater wafer. Therefore, the heater chips are diced from the wafer while the heating elements are visible. A precise cut is enough to dice the heater chips. Furthermore, having only one precise cut eliminates the problem of polyimide flaking and uneven edges due to having multiple cuts. Second, the channels and the nozzles are already made in one piece with the same distance between all the adjacent channels and the adjacent nozzles which eliminates the need for aligning the channels and nozzles of every two modules. Third, abutting the heater chips together is much easier since the heater chips do not have the channel chips covering them. Having the heating elements visible makes the alignment much easier. Moreover, this method eliminates the complexity of the electronics and the alignment of print heads with staggered modules.

This invention also eliminates the problems of the construction disclosed in U.S. Pat. No.4,829,324. Several problems are caused by the abutting channel chip construction of this patent. First, a misalignment of the pitch between adjacent nozzles of abutting channel chips with the pitch of the rest of the nozzles on the same chip will cause either a blank space or an overlap of printed information. Second, a misalignment of the nozzles with respect to a printed line will cause printed information to appear above or below the line. By molding a channel plate, the alignment between adjacent channels and nozzles can be closely held and the aforementioned misalignment problems caused by the abutting channel chip construction of U.S. Pat. No. 4,829,324 are essentially eliminated. Alignment tolerances do not have to be held as close with the heater chips as the channel chips since the ejection of ink droplets are not affected by slightly misaligned heater chips. Therefore, a slight misalignment of the heater chips, due to abutting the heater chips, will not be observed on a printed document.

Finally, another important feature of this invention is in abutting the heater chips. In this method, due to a full precise cut, each heater chip 84, 84$_a$ and 84$_b$ has a full contact with the preceding and the following modules along 500 micron long edges 85, 85$_a$ and 85$_b$ verses the prior art shown in FIG. 6 in which each module 42 and 42$_a$ has only a 60-70 micron contact along the junction line 44 to the next module. Also, one precise cut prevents the polyimide from flaking and as a result, the contact surface becomes much smoother and it improves the tolerance of abutting the heater chips. The tolerance of this method is about 0.25 micron verses about 1 micron tolerance when a four step cut is used.

FIG. 9 shows the end structure of the heater chips assembly of this invention. In this invention, the heater chips 84, 84$_a$ and 84$_b$ are abutted together and then the channel plate 82 is aligned and bonded to the heater chip assembly. To assemble a print head bar 80 (FIG. 10) of this invention, all the heater chips 84, 84$_a$ and 84$_b$ must be placed in an alignment and assembly fixture and pushed against the fixture for alignment in an abutting relationship. Next, a monolithic page wide channel plate 82 is flipped onto the assembled heater chips. After aligning the channels of the channel plate with the heating elements 88, 88$_b$ and 88$_c$ of the heater chip, the channel plate is bonded to the assembly of the heater chips, as shown in FIG. 10.

Figure 10:
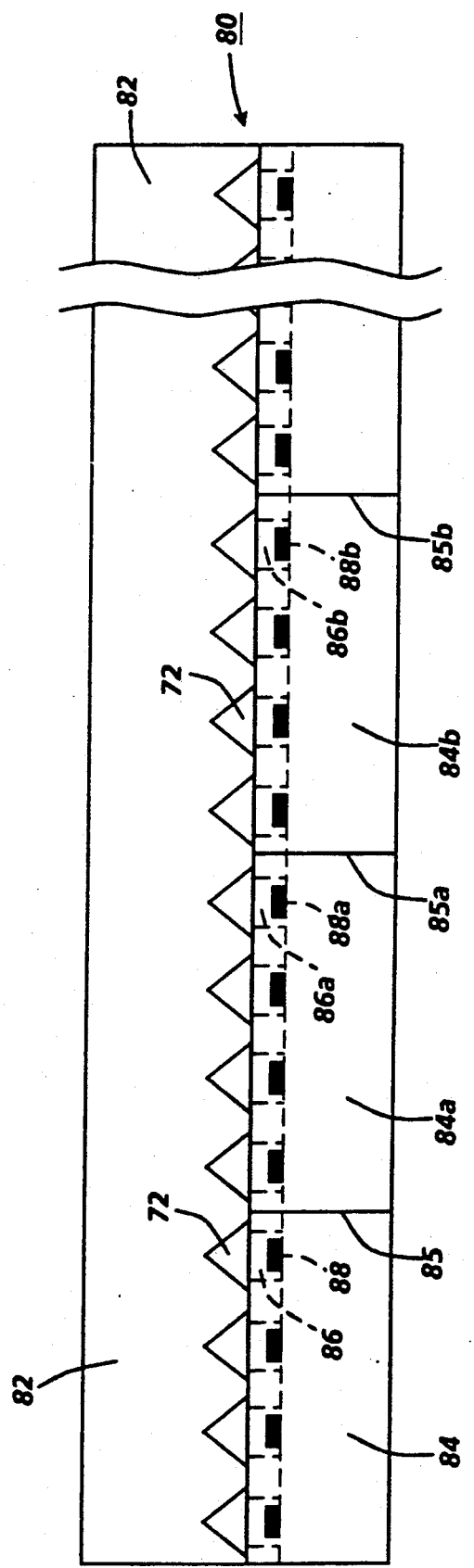
FIG. 10 is a side view of an end structure of the channel plate and heater chips assembly of the present invention.

While the embodiment of FIGS. 9 and 10 utilizes abutting heater chips, it should be understood that the heater chips could be cut to have a shorter length and a space can be left between the heater chips along the junction lines 85, 85$_a$ and 85$_b$ in a way that the pitch between the centers of the end containment chambers of adjacent chips has the same pitch as the centers of the adjacent containment chambers on the same chip.

The channel plate is usually built to be at least twice as long as the length of a heater chip since it is more advantageous to use a channel plate of this invention when there are more than one heater chip used. The heater chips are made to have the conventional length of 0.5 to 3 cm. It is possible to make the heater chips longer, however; the yield usually goes down with longer chips. Therefore, it is desirable to make a plurality of smaller heater chips, which have less chance of containing defective heating elements, and abut them together.

What is claimed is:

1. A method of fabricating a thermal ink jet print head bar, comprising the steps of:
   molding a monolithic channel plate having a plurality of channels therein, with a distance between the centers of adjacent channels being a maximum of 84.5 microns from each other;
   precisely separating at least two heater chips from a polysilicon heater wafer;
   each said heater chip having a plurality of containment chambers with a respective heating element therein;
   attaching said at least two heater chips to said channel plate with each channel being aligned with a respective containment chamber; and
   the number of containment chambers in said heater chips equalling the number of channels in said channel plate and said channel plate being at least twice the length of a heater chip.

2. The method of fabricating a thermal ink jet print head bar as recited in claim 1, wherein said at least two heater chips abut each other.

* * * * *